United States Patent
Shukla (10) Patent No.: US 9,445,448 B1
(45) Date of Patent: Sep. 13, 2016

(54) TUNNELED DIRECT LINK SETUP OPTIMIZATION

(71) Applicant: MARVELL INTERNATIONAL LTD., Hamilton (BM)

(72) Inventor: Ashish Kumar Shukla, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 59 days.

(21) Appl. No.: 14/299,061

(22) Filed: Jun. 9, 2014

Related U.S. Application Data (62) Division of application No. 13/372,908, filed on Feb. 14, 2012, now Pat. No. 8,750,273.

(60) Provisional application No. 61/442,607, filed on Feb. 14, 2011.

(51) Int. Cl.
*H04W 76/02* (2009.01)

(52) U.S. Cl.
CPC ......... *H04W 76/023* (2013.01); *H04W 76/027* (2013.01)

(58) Field of Classification Search
CPC H04W 12/08; H04W 76/023; H04W 76/027
See application file for complete search history.

(56) References Cited

U.S. PATENT DOCUMENTS

| | | | |
|---|---|---|---|
| 2010/0040007 A1* | 2/2010 | Itagaki | H04L 47/10 370/329 |
| 2011/0034127 A1 | 2/2011 | Wentink et al. | |
| 2011/0188429 A1 | 8/2011 | Seok | |
| 2011/0280234 A1 | 11/2011 | Wentink | |
| 2012/0057577 A1 | 3/2012 | Dwivedi et al. | |

\* cited by examiner

*Primary Examiner* — Pao Sinkantarakorn (57) ABSTRACT

Systems, methods, and other embodiments associated with wireless direct links are described. According to one embodiment, a method comprises establishing, by a first station, a wireless connection with an access point. The first station thereafter receives a direct link request from a peer station, wherein the direct link request is a request from the peer station to set up a direct link with the first station. Parameters of the direct link request are analyzed to determine if the direct link request includes invalid parameters. In response to determining that at least one invalid parameter is found in the direct link request, dropping the direct link request and not transmitting a reply message to the peer station.

18 Claims, 6 Drawing Sheets

TUNNELED DIRECT LINK SETUP OPTIMIZATION

CROSS REFERENCE TO RELATED APPLICATIONS

This patent disclosure is a divisional of U.S. patent application Ser. No. 13/372,908 filed on Feb. 14, 2012, now U.S. Pat. No. 8,750,273; which claims the benefit of U.S. Provisional Application No. 61/442,607; filed on Feb. 14, 2011, which is hereby both wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

IEEE 802.11 is a set of standards managed by the IEEE LAN/MAN Standards Committee that govern wireless networking transmission methods. For example, the following standards—802.11a, 802.11b, 802.11g, and 802.11n among others—are commonly used to provide wireless connectivity among wireless communication devices, and provide the basis for wireless communications devices using the "Wi-Fi" brand name. Bluetooth® is an example of another wireless communication standard that governs wireless networking transmission methods. The Bluetooth standard is managed by the Bluetooth Special Interest Group.

In the IEEE 802.11, a Basic Service Set (BSS) means a set of stations (STAs) successfully synchronized with each other. A Basic Service Area (BSA) means an area including members of the BSS. The BSA can vary depending on propagation characteristics of a wireless medium and thus the boundary can vary. The BSS can be basically classified into two kinds: an independent BSS (IBSS) and an infra-structured BSS. The former means a BSS that constitutes a self-contained network and that is not permitted to access a Distribution System (DS). The latter means a BSS that includes one or more Access Points (APs) and a distribution system and that uses the APs in all the communication processes including communications between the Non-AP stations.

Wireless protocol IEEE 802.11z defines a protocol which allows wireless 802.11 stations (STAs) that are associated with the same Access Point (AP) to set up a direct link, e.g. a wireless peer-to-peer connection, directly between them. The protocol is referred to as Tunneled Direct Link Setup (TDLS). While trying to comply with IEEE 802.11z rules, a number of functions performed between directly connected stations include inefficient procedures (e.g., transmission of extra messages/frames, cause delays in responses, and so on) that may consume device power and/or create unnecessary network traffic. Optimizing certain procedures may be beneficial.

SUMMARY

According to one aspect of the disclosure, an apparatus comprises a transceiver configured to wirelessly communicate with an access point, wherein the transceiver is configured to: receive direct link requests from peer stations, wherein a direct link request is a request from a peer station to set up a direct link with the apparatus; analyze at least parameters of the direct link request to determine if the direct link request includes invalid parameters; and in response to determining that at least one invalid parameter is found in the direct link request, the transceiver is configured to drop the direct link request and does not transmit a reply message to the peer station.

According to one aspect of the disclosure, a method comprises establishing, by a first station, a wireless connection with an access point. The first station thereafter receives a direct link request from a peer station, wherein the direct link request is a request from the peer station to set up a direct link with the first station. Parameters of the direct link request are analyzed to determine if the direct link request includes invalid parameters. In response to determining that at least one invalid parameter is found in the direct link request, dropping the direct link request and not transmitting a reply message to the peer station.

According to another aspect of the disclosure, a device comprises a system-on-chip comprising a transceiver configured to communicate with at least both an access point and a peer station, wherein the transceiver is configured to: communicate with the peer station via a direct link if a direct link request is accepted, wherein the direct link is established in accordance with a wireless communication standard that specifies that a reply message be transmitting when a direct link request is rejected; in response to receiving a direct link request from the peer station, analyze at least parameters of the direct link request to determine if the direct link request includes invalid parameters; and in response to determining that at least one invalid parameter is found in the direct link request, the transceiver is configured to (i) reject the direct link request, and (ii) drop the direct link request without transmitting a reply message to the peer station contrary to the wireless communication standard.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some embodiments, one element may be designed as multiple elements or that multiple elements may be designed as one element. In some examples, an element shown as an internal component of another element may be implemented as an external component and vice versa.

DETAILED DESCRIPTION

Described herein are example systems, methods, and other embodiments associated with optimizing communications involved with wireless direct links such as direct links established using tunneled direct link setup (TDLS).

Figure 1:
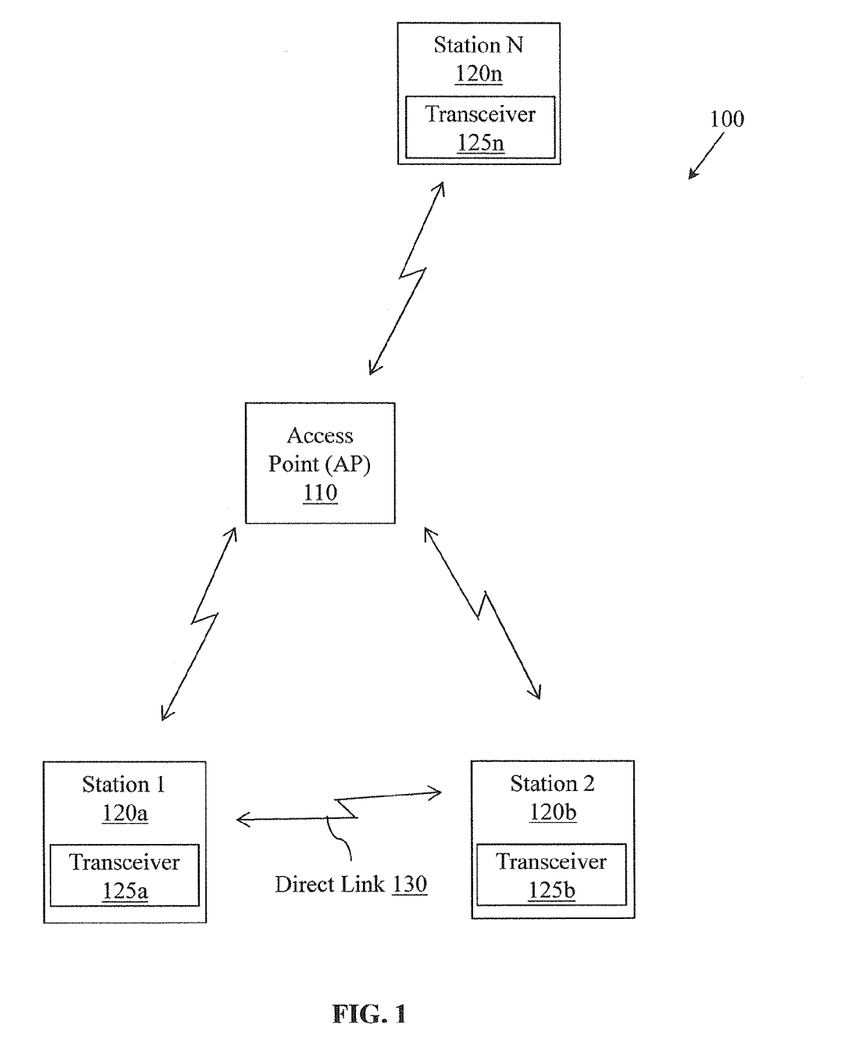
FIG. 1 illustrates one embodiment of a wireless network.

With reference to FIG. 1, one embodiment of a wireless network 100 is illustrated, which will be used in the discussions of one or more of the embodiments herein. The wireless network 100, which may also be referred to herein as a basic service set (BSS), is formed from one or more wireless nodes, generally designated as an access point (AP) 110 and a plurality of access terminals or subscriber stations (STAs) 120a-n. Each wireless node is generally capable of receiving and/or transmitting signals based on an implemented wireless protocol with a transceiver and antenna. The wireless network 100 may support any number of APs 110 distributed throughout a geographic region to provide coverage for the STAs 120a-n. A system controller (not shown) may be used to provide coordination and control among multiple access points, as well as access to other networks (e.g., the Internet) for the STAs 120a-n. For simplicity, one access point AP 110 is shown in FIG. 1 and the following examples herein.

In one embodiment, the AP 110 is generally a fixed terminal that provides backhaul services to the STAs 120a-n in its geographic region of coverage. However, the AP 110 may be mobile in some applications. The STAs 120a-n may be fixed or mobile. Examples of STAs 120a-n include a telephone (e.g., cellular telephone, smart phone), a laptop computer, a desktop computer, a Personal Digital Assistant (PDA), a digital audio player (e.g., MP3 player), a camera, a game console, a printing device, or any other suitable wireless node.

Each station STA 120a-n includes a radio frequency RF transceiver 125a-n for interacting with the AP 110 and/or with each other. Each station 120a-n can also include a baseband processor (not shown) and a media access controller (MAC) (not shown). The transceiver 125a is configured to receive and transmit data from/to the AP 110. The baseband processor is configured to process the RF signals from/to baseband in conformance with the radio frequency transmission protocol in use by the access point 110. In one embodiment, one or more components of the transceiver 125a, the baseband processor, and/or the MAC may be co-located on a single integrated circuit chip (e.g., a system-on-chip SoC). In another embodiment, the components may be implemented on separated integrated circuits within the station.

The wireless network 100 may sometimes be referred to as a wireless local area network (WLAN), and may employ a variety of widely used networking protocols to interconnect nearby devices, such as WiFi, or, more generally, any member of the Institute of Electrical and Electronics Engineers (IEEE) 802.11 wireless protocol family. In general, the wireless network 100 may provide operation in two distinct modes: infrastructure mode and ad-hoc mode. In infrastructure mode, the AP 110 serves as a hub for connecting the STAs 120 to each other or to the network infrastructure through various backhaul services, including, for example, Internet access Infrastructure mode, for example, uses a client-server architecture to provide connectivity for and among the STAs 120a-n. In ad-hoc mode, the STAs 120a-n may engage in direct link communications with each other in a peer-to-peer architecture.

One example networking protocol that provides direct link communications among stations is IEEE 802.11z, which defines a protocol for STAs associated with the same AP to set up a direct link between the STAs. The protocol is referred to as Tunneled Direct Link Setup (TDLS). TDLS setup messages are encapsulated in a specific Ethertype, so that they may be tunneled through any access point.

Conventionally, TDLS assumes that discovery of other STAs in the same Basic Service Set (BSS) (e.g., associated with the same access point) is based on detecting source and destination addresses. To setup a direct link, a first station sends a TDLS setup request message to another station and if the request is accepted, a direct link is established. The following embodiments describe optimization techniques that can be implemented for stations communicating over a direct link.

Embodiment 1

Denial of Service Attack During TDLS Setup

In one embodiment, the transceiver 125a is configured to identify and handle invalid TDLS setup request messages that may be a denial of service (DoS) attack. With continued reference for FIG. 1, consider the network 100 where station 1 and station 2 are connected to the access point 110. Station 2 then begins sending TDLS setup request messages to Station 1 in an attempt to establish a direct link 130. A proper TDLS setup request does not include erroneous frames or invalid parameters. According to current rules of IEEE 802.11z, when a station receives a TDLS setup request containing errors, the receiving station replies with a response that indicates the error and what parameter was invalid.

For example, in prior systems, if a rogue station intentionally sends invalid requests and continues to send them, the receiving station is caused to continuously process the requests and respond to each of them by transmitting reply messages that indicate the error and reject the request. The receiving station thus consumes resources and power, and allows an attacker to establish denial of service attack by continuously sending invalid setup requests to a station. In one embodiment, transceiver 125a in station 1 is configured to handle this situation and reduce the processing involved with invalid TDLS setup requests. In one embodiment, transceiver 125a is configured to perform method 200 as described with reference to FIG. 2.

Figure 2:
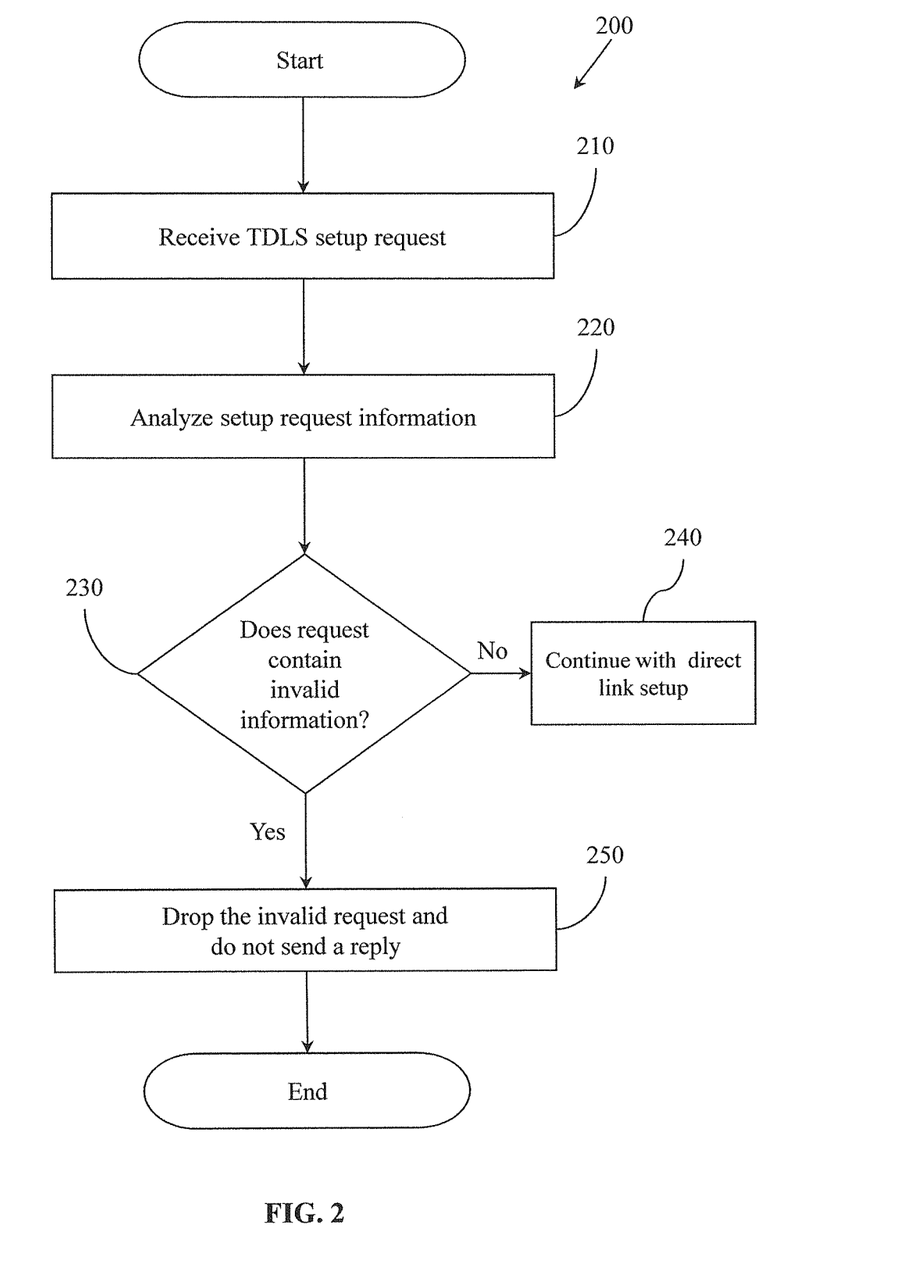
FIG. 2 illustrates one embodiment of method associated with processing invalid TDLS setup requests.

FIG. 2 illustrates one embodiment of method 200 associated with processing invalid TDLS setup requests. Method 200 will be described in the context of the network 100 as shown in FIG. 1 and that station 1 is receiving TDLS setup requests from station 2.

At 210, the method initiates when station 1 receives a TDLS setup request. At 220, information and parameters in the request are analyzed to determine if parameters are missing, are invalid, or otherwise erroneous for a proper setup request. Various types of invalid parameters will be described below. At 230, if the setup request does not contain invalid information or parameters but is a valid request, then at 240, the method continues with establishing a direct link with the requesting station. If however the request does contain invalid information or parameters, the request is judged as a fake. The method continues to 250 where the invalid request is dropped and no response is transmitted back to the requesting station contrary to the protocol rules (e.g., silently dropped). Thus, the receiving station avoids transmitting reply messages, and reduces time and resources spent that may be involved with generating and transmitting the replies, and reduces consumption of network bandwidth.

In one embodiment, the following examples show different types of possible invalid TDLS setup requests per IEEE 802.11z. Some invalid parameters may be due to missing values or may be invalid due to a current configuration of the network (e.g., incompatible value based on other conditions). Of course, the transceiver 125*a* can be configured to check for various types of possible errors based on desired implementations and/or protocol requirements.

For example, if the TDLS responder STA does not have security enabled on the link with the access point (e.g., an open link with the AP 110) but the TDLS setup requests includes a parameter for a secure direct link, the TDLS setup request is invalid and is rejected. Since the link with the AP 110 is open, it does not make sense to establish a secure direct link since there is no security between station 1 and station 2 via the open link with the access point 110. The links between stations and the access point should be the same as the direct links (e.g., both secure or both non-secure/open).

In the opposite scenario, if the TDLS responder STA (station 1) has security enabled on the link with the AP 110, station 1 checks whether the request includes an RSN IE (robust security network information element), which indicates the setup request is secure. If not, station 1 rejects the request since both the AP link and the direct link should be secure. Thus the setup request includes an invalid parameter and is silently dropped.

In another example error, if the version field of the RSN IE is zero, then the TDLS responder station (station 1) may reject the request since the value is an unsupported RSN information element version. Otherwise, the TDLS responder station 1 may be configured to process the setup requests as follows:

If the contents of the RSN IE do not indicate AKM of TPK Handshake (suite type 00-0F-38 AC:7), the station 1 may reject the setup request as an "Invalid 39 AKMP". If Pairwise ciphers include WEP-40, WEP-104 or TKIP, then station 1 may reject the TDLS setup request as an invalid pairwise cipher. These examples are not intended to be limiting and station 1 may be configured to check other error conditions as desired and/or applicable to a particular network environment.

Embodiment 2

Channel Switch

Figure 3:
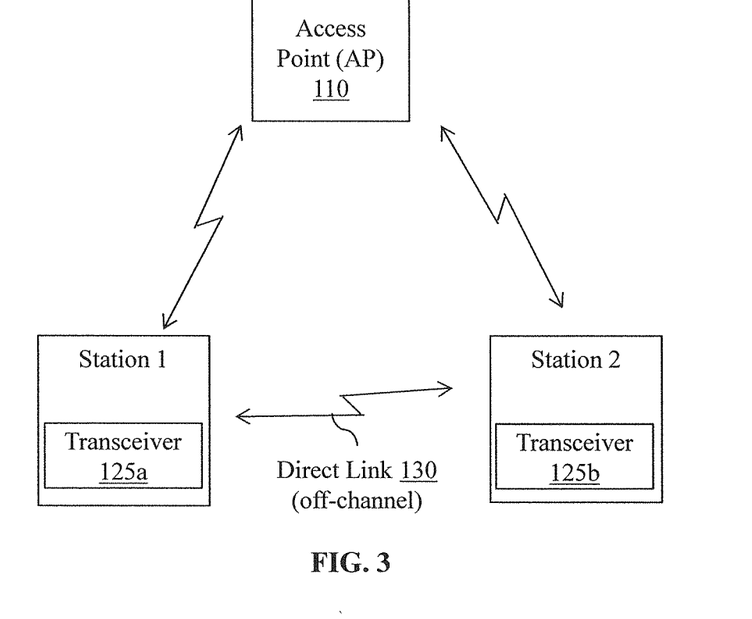
FIG. 3 illustrates one embodiment of a network associated with FIG. 1 for switch channels.

With reference to FIG. 3, in one embodiment of a system for channel switching is shown. Assume a similar network configuration as shown in FIG. 1 where station 1 and station 2 are wirelessly connected to the access point 110. Suppose the access point connection is on channel 6 (e.g., base channel). In some situations, channel 6 may become busy and station 1 determines that a faster connection is desired to transfer data to station 2. Thus in one embodiment, the transceiver 125*a* of station 1 is configured to initiate and perform a channel switch with station 2 over a direct link 130 (e.g., exchanging channel switch request and response over direct link and move off-channel).

Station 1 negotiates a time to switch "Switch Time", and after which station 1 waits for "Probe Delay". In one embodiment, immediately after the probe delay, the channel switch should not collide with other data on the off-channel. In one embodiment, presume that if there is no communication on the off-channel over the direct link 130 within a "Switch Timeout" period, station 1 is configured to fallback to use the base (associated) channel with the access point 110. Also, while station 1 is on the off-channel, station 1 maintains connectivity.

Since data traffic over the direct link 130 needs to stop for a time duration of Switch Timeout+Probe Delay, it's desired to minimize the switch time to minimize the disruption of the direct link 130. In one embodiment, to minimize the disruption on the direct link 130, transceiver 125*a* is configured to precede the channel switch exchange with a protection frame to protect the medium for the exchange. In one embodiment, the protection frame is RTS-CTS or a CTS-2-Self packet. RTS/CTS is a Request to Send/Clear to Send frame that requests a time during which all the stations that are not addressed by RTS and CTS defer accessing the medium for the duration specified in the RTS/CTS frame thus allowing reduced interference and thereby faster channel switch. Similarly, the CTS-2-Self packet (clear to send to self) is a handshaking message that tells other stations not to send data and identifies a time duration during which transmissions should not occur.

Figure 4:
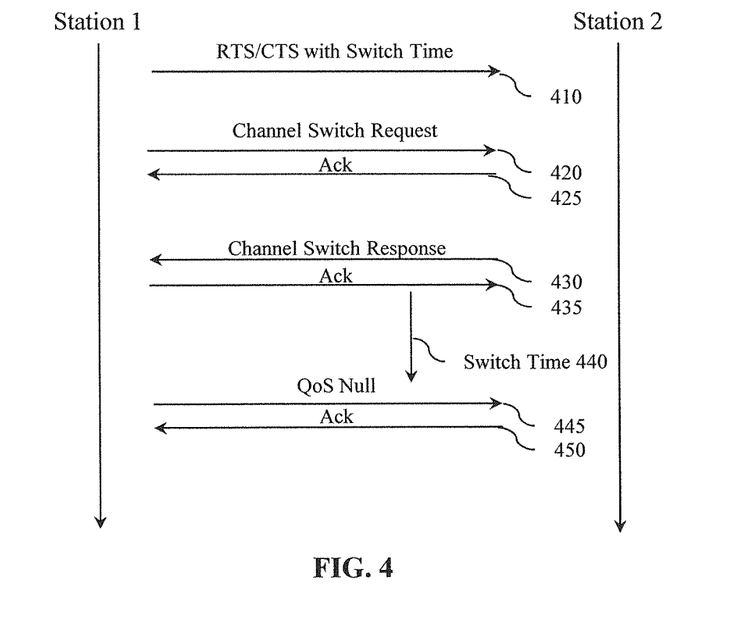
FIG. 4 illustrates one embodiment of a wireless network with a buffer station and a sleep station.

With reference to FIG. 4, one example of signal exchanges is shown between station 1 and station 2 over the direct link. In one embodiment, station 1 (the initiator of the channel switch) sends RTS 410 with a time duration to cover the time needed to perform the channel switch (e.g., switch time). In one embodiment, the time duration is calculated from time values for CTS+SIFS+Channel Switch Request+Delta (e.g., additional time to have prioritized access to transmit Channel Switch Response by peer station). CTS is the time for the clear-to-send packet. SIFS refers to short interframe spacing, where interframe spacing (IFS) is a time interval in which frames cannot be transmitted by stations. This space between frames ensures that frames do not overlap each other. Short interframe spacing (SIFS) is the shortest of the available IFS parameters in IEEE 802.11. Frames that are specified to use SIFS will take priority over frames that are specified to use other types of spacing. After receiving CTS or after transmitting CTS2Self, station 1 sends the channel switch request 420 and receives the associated acknowledgement 425.

Within the Delta time, the responder station 2 sends a Channel Switch Response 430, and then receives an acknowledgment 435. Based on the negotiated switch time 440, station 1 waits at least this amount of time to allow station 2 to complete the channel switch on its end. Station 1 then sends a QoS Null frame (quality of service) 445 one the new channel to detect whether peer station 2 is operating on the new channel. If an acknowledgement 450 is received, then station 1 may begin transferring data over the new channel over the direct link 130.

In another embodiment, the RTS/CTS-2-Self duration is assigned a time that covers the time for the Channel Switch Request and then the responder station 2 also sends RTS/CTS before sending the Channel Switch Response to cover the time needed for the response. In this manner, separate protection time durations are negotiated during the exchange.

In another embodiment, station 1 is configured to send a CTS-2-Self packet with the RTS signal 410 that is configured with a switch time duration equal to SIFS+Channel Switch frame (Request/Response) transmission time.

In another embodiment, station 1 transmits the RTS 410 with CTS or CTS-2-Self (as indicated previously with time duration including Channel Switch Response frame). In response, station 2 is configured to send an unsolicited Channel Switch Response 430 to peer station 1 indicating the base channel. This sequence saves one frame transmission since the channel switch request 420 is not used.

In another embodiment, when both stations support Peer U-APSD (Unscheduled Automatic Power Save Delivery), one station may change states to a Peer U-APSD Sleep mode. This allows the station to move to any channel when it wakes up from sleep mode.

In yet another embodiment, station 1 is configured to keep the connection with the access point 110 active while station 1 is communicating on the direct link off-channel. For example, station 1 may send "keep-alive" null frames to the access point 110 to maintain connectivity with the access point 110 link. The null frames serve to ensure that the link does not time-out from lack of activity. In one embodiment, the time-out period may be defined as the "BSS Max Idle Period," which is an IEEE 802.11v feature, or any other inactivity timeout defined by the access point 110.

To select a channel to switch to, transceiver 125a is configured to implement a channel selection policy that considers one or more characteristics of the available channels. For example, the channel selection policy may be an algorithm that considers the channel load (e.g., lower load is more desirable) and/or a level of interference on the channel (e.g., based on IEEE 802.11k/v). Other considerations may include radar or regulatory requirements in the area, or make a 40 MHz, off-channel selection that makes sure that the primary channel is aligned with most of the device on that channel. Other considerations may be implemented as desired based on application requirements.

Embodiment 3

Peer UAPSD and Voice Frame Latency

This embodiment addresses a situation where station 1 transfers voice frames over the direct link 130 to station 2, however station 2 is in or occasionally goes into power save mode. In general, by going into power save mode, additional latency is created that may affect the timely transmission of voice data frames.

Figure 5:
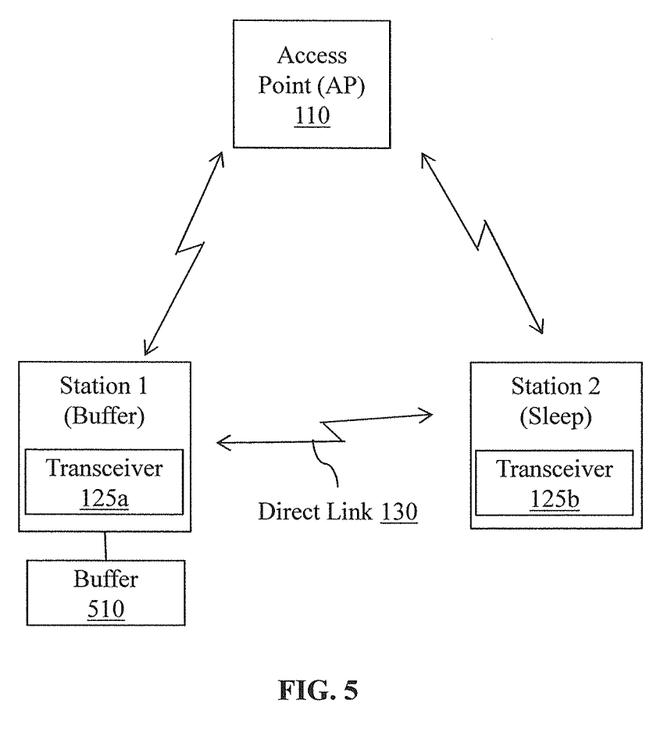
FIG. 5 illustrates one embodiment of a method for processing buffered data with a sleep station.

With reference to FIG. 5, consider a similar configuration to FIG. 1 but that station 2 is a "sleep station" and station 1 is a "buffer station", since it will perform a buffing function as described below. This configuration occurs when station 2 sends station 1 a notice that station 2 is going to sleep (e.g., power save mode PSM). In one embodiment, station 2 may enter PSM by setting a power management field in a frame control field of an acknowledged MAC protocol data unit (MPDU) transmitted to the peer station 1 over the direct link 130 and/or via the access point 110. When station 2 is sleeping, station 1 buffers all frames that are addressed for station 2 in a buffer 510.

The following example represents a prior technique and sequence of signals that were performed while station 2 is asleep. After the example, in one embodiment of an optimization is described.

In the prior technique, station 1 buffers frames for sleep station 2. Station 1 then sends a Peer Traffic Indication (PTI) frame to sleep station 2 through the access point 110. The PTI Request frame is a frame that indicates that station 1 is buffering data for station 2 and requests permission to transmit the data. The access point 110 sends an ACK to station 1 and then holds the PTI Request frame until station 2 wakes. When station 2 wakes (which occurs periodically), the first action it takes is to send a trigger frame (e.g., QoS Null Frame) to the access point 110 to indicate that station 2 is awake and to check for any buffered data. Access point 110 responds by sending the pending PTI Request frame to station 2. Upon learning that there is buffered data waiting, station 2 sends a PTI Response frame (e.g., also a trigger frame) over the direct link 130 to station 1. Upon receipt, station 1 then transmits one or more buffered frames during the wake period of station 2.

The prior technique is inefficient because the sleep station may not send the trigger frame to station 1 to receive the buffered data over the direct link on a timely basis. Thus if the buffered data is voice data, the reception of data is too slow and may affect voice performance. Furthermore, if sleep station 2 is operating under IEEE power save mode, the periodic wake cycle is typically once every beacon interval, which is about every 100 ms. If station 2 wakes every 100 ms, the PTI Request frame cannot be received until that point in time. As such, station 2 cannot send the PTI Response frame to station 1 until at least the 100 ms from the last time station 2 was awake. Accordingly, the buffered frames at station 1 can only be sent every 100 ms interval. This latency may cause a problem with buffered voice traffic since a latency of about 20 ms is more desirable for smoother voice quality. Thus in one embodiment, station 1 needs to be able to send the buffered voice frames in shorter intervals (e.g., about every 20 ms or less).

Figure 6:
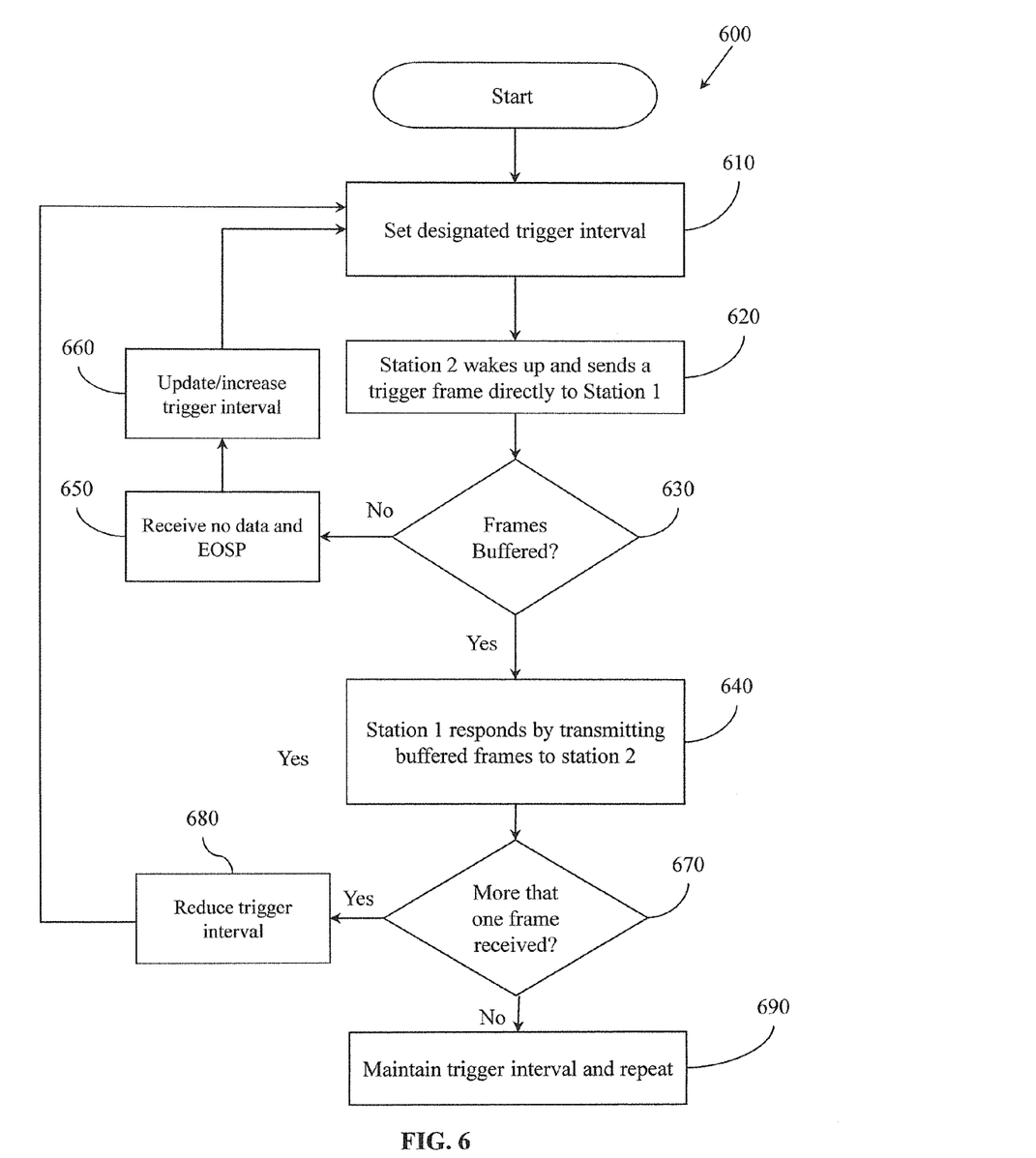
FIG. 6 illustrates one embodiment of a method for disconnecting a direct link.

With reference to FIG. 6, to reduce the latency of sleep station 2, in one embodiment, the transceiver 125b of station 2 is configured to perform method 600. At 610, a designated trigger interval is set to match a latency desired for processing a selected type of buffered data frames (e.g., voice traffic, video traffic, and so on). In the example, assume voice traffic is buffered and the wake interval is set at 20 ms.

At 620, upon waking at the wake interval, station 2 sends a trigger frame (e.g., QoS Null frame, null data frame) directly to buffer station 1 over the direct link 130. At 630, the trigger frame causes buffer station 1 to determine is any frames are buffered and if so, at 640, station 1 responds directly by transmitting any buffered frames to station 2 over the direct link. This process reduces latency as compared to the prior technique because sleep station 2 wakes at a smaller adaptive interval. Additionally, the trigger frame is sent to station 1 before sleep station 2 sends the typical trigger frame to the access point 110, which then would wait if a PTI Request frame was pending at the access point 110 and if so then station 2 would send a PTI Response frame to station 1, as described in the prior technique.

Thus at 620, in one embodiment, sleep station 2 operates with an assumption that frames are buffered at station 1 and directly sends the trigger frame to station 1 regardless of whether a PTI Request frame is pending at the access point 110.

In another embodiment, the trigger interval at 610 is configured to be adaptive to allow sleep station 2 to automatically adapt the value of the trigger interval. For example, the trigger interval is initially set a selected minimum value (e.g., 10 ms). At 630, in one embodiment, buffer station 1 is configured to start a service period and delivers buffered frames if they exist. However, if at 630 no frames are buffered, station 1 replies with a notice (e.g., Null EOSP: end of service period), which is received by station 2 at 650. At 660, the trigger interval is updated. For example, since no frames were received during the trigger interval, the trigger interval is increased by a selected factor and/or time amount. In one embodiment, the trigger interval N=aN+b, where a=2 and b=0 so that the updated trigger interval is twice the previous interval. The method then returns to 610 and the process repeats.

Conversely, if at 640, station 2 receives more than one data frame during the trigger interval, station 2 assumes it is not sending the trigger frame fast enough (e.g., not probing station 1 fast enough for buffered data). Thus the trigger interval is reduced by a selected factor and/or amount (e.g., trigger interval N=cN−d, where c is a selected fractional factor and d is a time amount). In one embodiment, the trigger interval is modified and updated toward a value where one buffered frame is received during one trigger interval. At 690, this condition is met and the trigger interval is not modified and the process may repeat for the next sleep/wake cycle. Of course, other desired intervals may be implemented.

In this manner, transmitting voice data to a sleep station can be improved by reducing the latency associated with the sleep/wake intervals.

Embodiment 4

Disassociation of Access Point

This embodiment relates to deauthentication/disassociation of a link with an access point and TDLS link teardown.

Consider once again the network 100 shown in FIG. 1 where station 1 and station 2 are connected to the access point 110. Assume there are multiple other stations connected to the access point 110 that are not shown. Also, station 1 and station 2 have a direct link 130 established. Also consider in one example that the direct link is established in accordance with a wireless communication standard that specifies that a tear down frame be sent to tear down the direct link. In one embodiment, consider that the wireless protocol of network 100 requires that for a direct link to be established between two stations, both stations must be associated to the same access point. IEEE 802.11z currently includes this requirement. Thus in FIG. 1, station 1 is permitted to establish a direct link with station 2 since both stations are connected to the same access point 110.

However, if the connection to the access point 110 is disassociated/disconnected for any reason, any direct links will also be disconnected after an exchange of messages between the stations. For example, IEEE 802.11z currently states that after a station (e.g., station 1) receives a disassociation notice (e.g., a deauthentication/disassociation frame) from the access point 110, station 1 must send a Tear Down/Deauthentication frame to peer station 2 over the direct link 130 to initiate a disconnection process for direct link 130. Likewise, station 2 will also send its own Tear Down/Deauthentication frame to peer station 1 over the direct link 130 to initiate a disconnection process for direct link 130. The deauthentication/disassociation frame is the frame used by the access point to instruct any connected stations that the link will be disconnected. Examples of when the access point link might be disconnected include when the access point is powering down, moving to a different communication channel, and so on.

In some conditions, the access point 110 is configured to send a deauthentication/disassociation frame to a station by addressing the frame to each individual station. In other conditions, the access point 110 may address the deauthentication/disassociation frame as a group and broadcast the frame to everyone.

Thus in the network of FIG. 1, every station (1, 2, 3, and so on) will receive a separate deauthentication/disassociation frame (whether individually or by broadcast) if the access point 110 is disconnecting its link. In response, all stations that have a direct link with a peer station (e.g., both station 1 and station 2) will send a tear down frame to each other to initiate a link disconnection process. In this scenario, two tear down frames are transmitted: (i) station 1 to station 2, and (ii) station 2 to station 1. This results in unnecessary communication of frames and waste of resources. Consider a network that includes 50 stations all of which have direct links to each other. The stations would all be sending each other tear down frames, which in the end accomplish the same result; disconnecting the direct links.

To reduce the number of frames transmitted during a deauthentication/disassociation with an access point, transceiver 125a and/or 125b is configured to process the disconnection more efficiently. In one embodiment, transceiver 125a is configured to perform actions of method 700 as shown in FIG. 7

Figure 7:
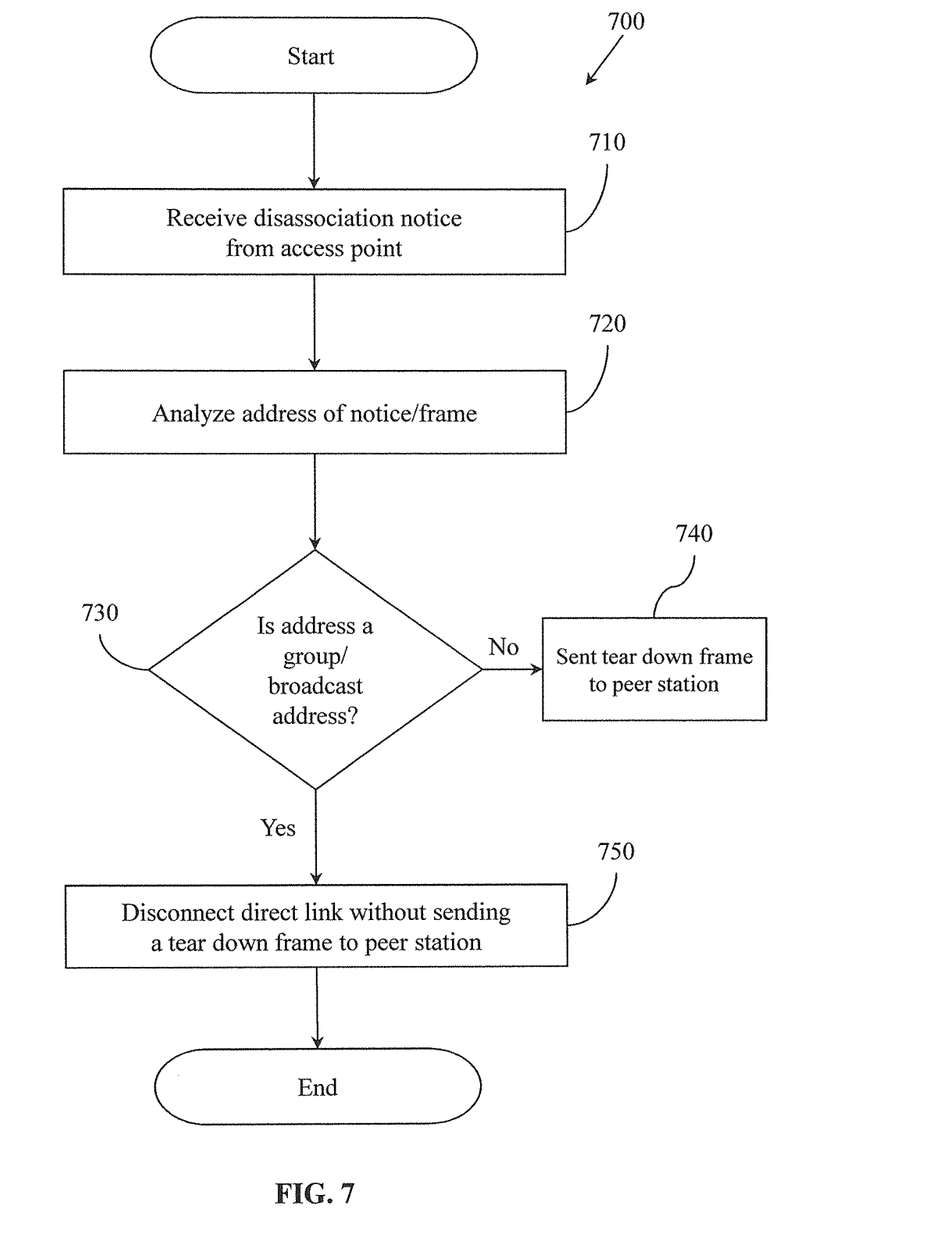
FIG. 7 illustrates one embodiment of method that is associated with processing a tear down of a direct link.

With reference to FIG. 7, one embodiment of method 700 is shown that is associated with processing a tear down of a direct link. Method 700 is discussed from the perspective of station 1 and includes actions performed by station 1. At 710, the method initiates when a disassociation notice (e.g., a deauthentication/disassociation frame) is received from an access point that indicates that the access point will be disassociating from station 1. At 720, station 1 analyzes the address of the frame to determine whether the frame is addressed specifically to station 1 or is addressed as a group or is otherwise a broadcast frame.

At 730, if the frame is addressed to station 1, then it is not a group frame and the method continues to 740 where a tear down frame is transmitted to peer station 2 to initiate the disconnection process of the direct link as specified by the wireless communication standard used to establish the direct link (e.g., IEEE 802.11z). However, if at 730, the frame is a group or broadcast frame, the method continues to 750 where the direct link with station 2 is internally removed/disconnected by station 1 without sending a tear down frame to station 2 thereby not following the specified tear down process in the wireless communication standard. Thus in one embodiment, the transceiver 125a of station 1 is configured to neither generate nor send the tear down frames to peer station 2. Or alternately, if the tear down frame is generated by another component in station 1 to be transmitted by the transceiver 125a, the transceiver 125a is configured to identify and prevent the tear down frame(s) from being transmitted to peer station 2 and simply disconnect the direct link without transmitting messages (e.g., silently disconnect).

Station 1 operates under the assumption that since the deauthentication frame from the access point is group addressed, then all stations are being disconnected from the access point and all stations will be disconnecting their direct links. Thus station 1 also assumes that peer station 2 (which shares the same access point 110) also received a deauthentication frame from the access point since it was a group broadcast. Accordingly, there is no need to exchange or swap tear down requests since every station will disconnect their links. Therefore, sending tear down frames serves no purpose and wastes resources. For example, if there are N TDLS direct links on the network, then there will be a minimum of 2N tear down/deauthentication frames transmitted, which wastes power and network bandwidth.

Thus, the disconnection process is optimization by, after reception of group addressed deauthentication from an access point, the TDLS stations do not send tear down/deauthentication frames to peer stations. The direct links are silently disconnected by actions internal to the station.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Frame", as used herein, includes but is not limited to a data transmission unit or data packet.

"Logic", as used herein, includes but is not limited to hardware, firmware, instructions stored on a non-transitory computer readable medium or in a machine, and/or combinations of any to perform a function(s) or an action(s), and/or to cause a function or action from another logic, method, and/or system. Logic may include a microprocessor programmed with stored instructions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements. For example, transceiver 125*a* of FIG. 1 is implemented in logic.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. In one embodiment, the methods represent algorithms implemented to control a processor, an integrated circuit, and/or other computer component to perform the method.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
    a transceiver configured to wirelessly communicate with an access point, wherein the transceiver is configured to:
        receive direct link requests from peer stations, wherein a direct link request is a request from a peer station to set up a direct link with the apparatus;
        analyze at least parameters of the direct link request to determine if the direct link request includes invalid parameters by determining if the transceiver has a communication link with the access point that is not secure, and the direct link request includes a parameter for a secure direct link, then the parameter is determined to be invalid; and
        in response to determining that at least one invalid parameter is found in the direct link request, the transceiver is configured to drop the direct link request and does not transmit a reply message to the peer station.

2. The apparatus of claim 1, wherein the direct link request is a request for a tunneled direct link setup with the peer station where the request is addressed to the apparatus.

3. The apparatus of claim 1, wherein the transceiver and the peer station are both in communication with the access point in a network.

4. The apparatus of claim 1, wherein the transceiver is configured to communicate with the peer station in accordance with a wireless communication standard that specifies rules that if a direct link setup request is received by a receiving station and the direct link setup request includes an invalid parameter, then the receiving station should transmit a reply message indicating the invalid parameter;
    wherein the transceiver is configured to drop the direct link request without transmitting the reply message to the peer station contrary to the specified rules.

5. The apparatus of claim 1, wherein the transceiver is configured to judge the direct link request as a fake request if the at least one the invalid parameter is determined.

6. The apparatus of claim 1, wherein the transceiver is configured to determine that the direct link request includes at least one invalid parameter if a missing value is found in the direct link request.

7. The apparatus of claim 1, wherein the transceiver is configured to determine that the at least one invalid parameter is found in the direct link request if a robust security network information element (RSN IE) is found in the direct link request that includes a value of zero.

8. The apparatus of claim 1, wherein the apparatus and the transceiver are implemented as a system on chip.

9. A method comprising:
    establishing, by a first station, a wireless connection with an access point;
    receiving, by the first station, a direct link request from a peer station, wherein the direct link request is a request from the peer station to set up a direct link with the first station;
    analyzing at least parameters of the direct link request to determine if the direct link request includes invalid parameters by determining if the wireless connection between the first station and the access point is an unsecure connection and the direct link request includes a parameter for a secure direct link, then the parameter is determined to be an invalid parameter; and in response to determining that at least one invalid parameter is found in the direct link request, dropping the direct link request and not transmitting a reply message to the peer station.

10. The method of claim 9, further comprising determining that the direct link request is a request for a tunneled direct link setup.

11. The method of claim 9, wherein both the first station and the peer station are in communication with the access point.

12. The method of claim 9, wherein the first station operates to communicate with the peer station in accordance with a wireless communication standard that specifies rules that if a direct link setup request is received by the first station and the direct link request includes an invalid parameter, then the first station should transmit a reply message indicating the invalid parameter; and wherein in response to determining that at least one invalid parameter is found in the direct link request, the method includes dropping the direct link request without transmitting the reply message to the peer station contrary to the specified rules.

13. The method of claim 9, further comprising judging, by the first station, the direct link request is a fake request if the at least one invalid parameter is determined.

14. The method of claim 9, further comprising determining that the at least one invalid parameter is found in the direct link request if a missing value is found in the direct link request.

15. A device comprising:
a system-on-chip comprising a transceiver configured to communicate with at least both an access point and a peer station, wherein the transceiver is configured to:
communicate with the access point by a wireless connection;
communicate with the peer station via a direct link after a direct link request is accepted from the peer station, wherein the direct link is established in accordance with a wireless communication standard that specifies that a reply message be transmitted when the direct link request is rejected;
in response to receiving a direct link request from the peer station wherein the direct link request is addressed to the device, analyze at least parameters of the direct link request to determine if the direct link request includes invalid parameters by determining if the wireless connection between the transceiver and the access point is an unsecure connection and the direct link request includes a parameter for a secure direct link, then the parameter is determined to be an invalid parameter; and
in response to determining that at least one invalid parameter is found in the direct link request, the transceiver is configured to (i) reject the direct link request, and (ii) drop the direct link request without transmitting a reply message to the peer station contrary to the wireless communication standard.

16. The device of claim 15, wherein the transceiver is configured to establish the direct link wirelessly using a tunneled direct link setup with the peer station.

17. The device of claim 15, wherein the transceiver and the peer station are both in communication with the access point.

18. The device of claim 15, wherein the transceiver is configured to judge the direct link request is a fake request if an invalid parameter is determined or if a missing value is found in the direct link request.

* * * * *